United States Patent
Hatfield

(10) Patent No.: US 10,382,544 B2
(45) Date of Patent: Aug. 13, 2019

(54) ESTABLISHING REVERSE PATHS BETWEEN SERVERS IN A COPY ENVIRONMENT

(71) Applicant: INTERNATIONAL BUSINESS MACHINES CORPORATION, Armonk, NY (US)

(72) Inventor: Brian D. Hatfield, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 585 days.

(21) Appl. No.: 15/094,051

(22) Filed: Apr. 8, 2016

(65) Prior Publication Data

US 2017/0295230 A1  Oct. 12, 2017

(51) Int. Cl.
G06F 15/16 (2006.01)
H04L 29/08 (2006.01)
H04L 12/751 (2013.01)

(52) U.S. Cl.
CPC .......... H04L 67/1095 (2013.01); H04L 45/02 (2013.01)

(58) Field of Classification Search
CPC . H04L 67/1095; H04L 45/02; H04M 15/8088
USPC ........................................................ 719/207
See application file for complete search history.

(56) References Cited

U.S. PATENT DOCUMENTS

| | | | |
|---|---|---|---|
| 6,035,412 A | 3/2000 | Tamer et al. | |
| 6,578,120 B1 | 6/2003 | Crockett et al. | |
| 6,671,705 B1 | 12/2003 | Duprey et al. | |
| 7,069,401 B1 * | 6/2006 | Noonan | G06F 11/1461 707/999.202 |
| 7,134,088 B2 * | 11/2006 | Larsen | G09B 9/003 715/765 |
| 7,461,226 B2 | 12/2008 | Iwamura et al. | |
| 7,603,581 B2 | 10/2009 | Boyd et al. | |
| 7,716,518 B2 | 5/2010 | Butterworth et al. | |
| 7,788,225 B2 | 8/2010 | Fish et al. | |
| 7,895,162 B2 | 2/2011 | Tanaka et al. | |

(Continued)

OTHER PUBLICATIONS

"Recovery Scenario using Incremental Resynchronization in a Metro/Global Mirror Configuration", IBM Corporation, [online] [retrived Apr. 25, 2015] http://www-01.ibm.com/support/knowledgecenter/api/content/nl/en-us/ . . . , pp. 12.

(Continued)

*Primary Examiner* — Thanh T Nguyen
(74) *Attorney, Agent, or Firm* — Konrad Raynes Davda & Victor LLP; David W. Victor

(57) ABSTRACT

Provided are a computer program product, system, and method for establishing reverse paths between servers in a copy environment. A path establish request operation is initiated to establish paths between a first system and a second system for a copy relationship to copy data from a first storage to a second storage managed by the second system. In response to the path establish request, a pair of ports is established at the first system and the second system to use for a first path from the first system to the second system. The first system sends a reverse path establish request to establish a second path from the second system to the first system, wherein the second system sends messages to the first system on the second path for the copy relationship.

25 Claims, 11 Drawing Sheets

(56) References Cited

U.S. PATENT DOCUMENTS

| | | | |
|---|---|---|---|
| 7,979,897 | B2 | 7/2011 | Klein et al. |
| 8,020,037 | B1 | 9/2011 | Schwartz et al. |
| 8,161,256 | B2 | 4/2012 | Hara et al. |
| 8,667,033 | B1 | 3/2014 | McCline et al. |
| 9,092,449 | B2 | 7/2015 | Brown et al. |
| 9,218,252 | B1 * | 12/2015 | Revur ................. G06F 16/2365 |
| 9,495,409 | B1 | 11/2016 | Revur et al. |
| 9,514,013 | B2 | 12/2016 | Hatfield |
| 9,514,409 | B2 | 12/2016 | Berlandier et al. |
| 9,727,243 | B2 * | 8/2017 | Hatfield ................. G06F 3/0604 |
| 2005/0050288 | A1 | 3/2005 | Takahashi et al. |
| 2006/0143497 | A1 | 6/2006 | Zohar et al. |
| 2007/0050547 | A1 | 3/2007 | Sano et al. |
| 2007/0174079 | A1 * | 7/2007 | Kraus .................... G06Q 10/10 705/3 |
| 2007/0198790 | A1 * | 8/2007 | Asano ................... G06F 3/0605 711/162 |
| 2008/0022058 | A1 | 1/2008 | Nadathur et al. |
| 2011/0238751 | A1 * | 9/2011 | Belimpasakis ......... G06F 3/011 709/204 |
| 2012/0210416 | A1 * | 8/2012 | Mihelich ............. H04L 63/0218 726/11 |
| 2014/0108345 | A1 | 4/2014 | Brown et al. |
| 2014/0156595 | A1 | 6/2014 | Rose et al. |
| 2014/0358854 | A1 * | 12/2014 | Tabenkin ................ G06F 8/658 707/620 |
| 2015/0378854 | A1 | 12/2015 | Hatfield |
| 2017/0003883 | A1 * | 1/2017 | Hatfield ................. G06F 3/0604 |
| 2017/0003895 | A1 | 1/2017 | Hatfield et al. |
| 2017/0036771 | A1 * | 2/2017 | Woodman .............. B64D 27/26 |
| 2017/0193008 | A1 * | 7/2017 | Kreft ........................ G01C 3/08 |

OTHER PUBLICATIONS

"Recovery Scenarios for Metro/Global Mirror with Incremental Resync", IBM Corporation, [online] [retrived Apr. 25, 2015] http://www-01.ibm.com/support/knowledgecenter/api/content/nl/en-us/ . . . , pp. 3.

Y.C. Lien, et al., "Method for Creating Consistent Bitmaps", IBM Corporation, IP.com, Jul. 1, 1990, TDB n2, Jul. 1990, p. 417-421, IP.com No. IPCOM000101300D, electronic publication Mar. 16, 2005.

D. Clitherow, "GDPS Family an Introduction to Concepts and Capabilities", IBM Corporation, Document SG24-6374-09, Aug. 2014, pp. 324.

List of IBM Patents or Patent Applications That Are Related dated Apr. 8, 2016, pp. 2.

U.S. Appl. No. 14/788,539, filed Jun. 30, 2015, 18.568.

U.S. Appl. No. 14/788,379, filed Jun. 30, 2015, 18.582.

U.S. Appl. No. 14/318,395, filed Jun. 27, 2014, 18.539.

Notice of Allowance dated Mar. 22, 2016, pp. 9, for U.S. Appl. No. 14/788,539, filed Jun. 30, 2015 (18.568).

Response dated Jan. 6, 2017, pp. 13, to Office Action dated Oct. 6, 2016, pp. 22, for U.S. Appl. No. 14/788,539, filed Jun. 30, 2015 (18.568).

Office Action dated Jul. 13, 2017, pp. 27, for U.S. Appl. No. 14/788,379, filed Jun. 30, 2015, (18.582).

Office Action dated Mar. 24, 2016, pp. 17, for U.S. Appl. No. 14/318,395, filed Jun. 27, 2014, 18.539.

Response dated Jun. 24, 2016, pp. 15, to Office Action dated Mar. 24, 2016, pp. 17, for U.S. Appl. No. 14/318,395, filed Jun. 27, 2014, 18.539.

Notice of Allowance dated Aug. 12, 2016, pp. 11, for U.S. Appl. No. 14/318,395, filed Jun. 27, 2014, 18.539.

Response dated Oct. 13, 2017, pp. 13, to Office Action dated Jul. 13, 2017, pp. 27, for U.S. Appl. No. 14/788,379, filed Jun. 30, 2015, (18.582).

Notice of Allowance dated Nov. 3, 2017, pp. 15, for U.S. Appl. No. 14/788,379, filed Jun. 30, 2015, (18.582).

Office Action dated Oct. 6, 2016, pp. 22, for U.S. Appl. No. 14/788,539, filed Jun. 30, 2015 (18.568).

* cited by examiner

Active Copy Relationship

Inactive Copy Relationship

Path Information

Path Establish Request

Reverse Path Establish Request

US 10,382,544 B2

ESTABLISHING REVERSE PATHS BETWEEN SERVERS IN A COPY ENVIRONMENT

BACKGROUND OF THE INVENTION

1. Field of the Invention

The present invention relates to a computer program product, system, and method for establishing reverse paths between servers in a copy environment.

2. Description of the Related Art

In a storage environment, a storage controller may maintain mirror copy relationships, where a source volume in a mirror copy relationship comprises the storage or volumes from which data is physically copied to a target volume. Failover programs, such as International Business Machines Corporation's ("IBM") HyperSwap® which is a function in the z/OS® operating system, provides continuous availability for disk failures by maintaining the mirror copy relationships to provide synchronous copies of source (primary) disk volumes in one or more storage systems to one or more target (secondary) volumes in one or more storage systems. (HyperSwap is a registered trademark of IBM in countries throughout the world). When a disk failure is detected, code in the operating system identifies HyperSwap managed volumes and instead of failing the I/O request, HyperSwap switches (or swaps) information in internal control blocks so that the I/O request is driven against the target volume of the mirror copy relationship. Since the target volume is an identical copy of the source volume prior to the failure, the I/O request will succeed with no impact to the program issuing the I/O request, which could be an application program or part of the operating system. This therefore masks the disk failure from the program and avoids an application and/or system outage.

A mirror copy relationship may maintain a current and previous bitmaps to keep track of updates at the source volume that need to be copied or synchronized to the target storage. A previous bitmap, also known as an out-of-synch bitmap, indicates updated data in the source volume that occurred in a previous interval, or consistency period, and a current bitmap, also known as a change recording bitmap, which indicates updated data in the source volume that occurred in the current interval or current consistency period. After the replication manager copies all updated data indicated in the previous bitmap, the bitmaps would be toggled to create a new interval, so that the previous bitmap is set to the current bitmap to copy all updated data prior to the new interval, and a new current bitmap would be initialized to record writes in the new interval. In this way, updates that occur while data is being synchronized get recorded without interfering with the synchronization of the writes as of the recent interval.

A bitmap toggle performed out-of-sequence could cause out-of-sync indicators to be reset when they should not be compromising the integrity of data in a remote copy relationship. A node sending a toggle message waits for responses from the nodes it sent messages to. If a response is not received within some amount of time, the messages must be aborted. Old messages are aborted by updating a sequence number. Once toggle messages are responded to or aborted by a sender-receiver pair handshaking a new sequence number, subsequent toggle messages can be sent.

One technique to allow a target to send a source server a toggle or other message is to have the source server send a read command to the target server and when the target has data or a message, the target responds to the read with the message or data to return.

There is a need in the art to provide improved messaging between target servers and source servers in a cascaded replication environment of numerous source and target pairs that are linked together.

SUMMARY

Provided are a computer program product, system, and method for establishing reverse paths between servers in a copy environment. A path establish request operation is initiated to establish paths between a first system and a second system for a copy relationship to copy data from a first storage to a second storage managed by the second system. In response to the path establish request, a pair of ports is established at the first system and the second system to use for a first path from the first system to the second system. The first system sends a reverse path establish request to establish a second path from the second system to the first system, wherein the second system sends messages to the first system on the second path for the copy relationship.

DETAILED DESCRIPTION

Described embodiments provide techniques to provide paths from a source server to a target server and from the target server to the source server in a replication environment to allow a target server to transfer messages to its source server, such as bitmap toggle requests which update synchronization information.

With described embodiments, a path establish request is initiated to establish paths between a first system (source server) and the second system (target server) for a copy relationship to copy data from the first storage to the second storage managed by the second system. In response to the path establish request, a pair of ports is established at the first system and the second system to use for a first path from the first system to the second system. The first system sends a reverse path establish request to establish a second path from the second system to the first system, wherein the second system sends messages to the first storage system on the second path.

In cascaded environments, the first system may have an established reverse path with another system, and in turn forward a message from the second system to another system on the reverse path and to other servers that are targets of the first system. In this way, a message can propagate through forward and reverse paths established between servers when active copy relationships are established.

Figure 1:
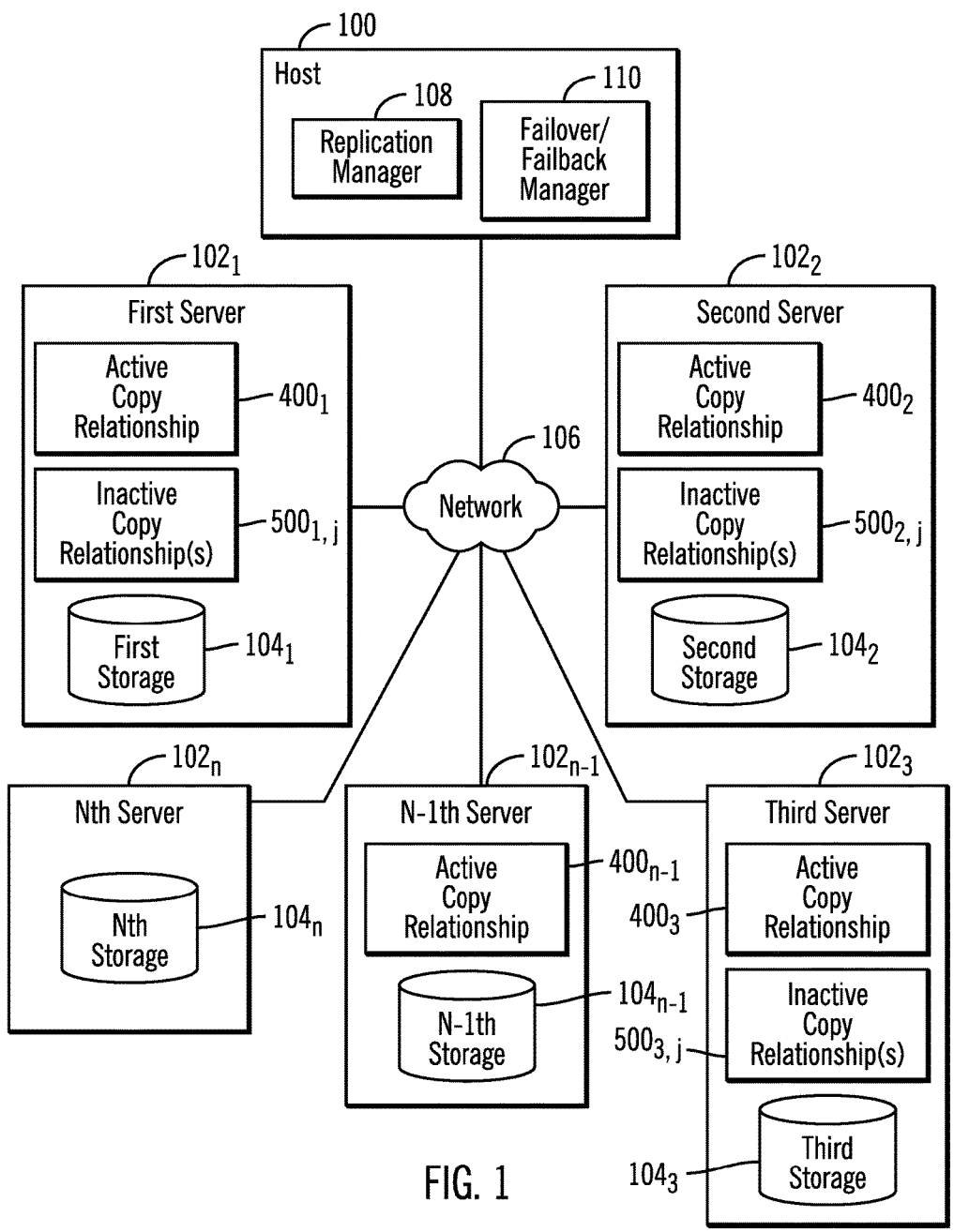
FIG. 1 illustrates an embodiment of a storage replication environment.

FIG. 1 illustrates an embodiment of a replication copy storage environment having a host system 100 that is connected to a plurality of storage servers $102_1$, $102_2$, $102_3$ ... $102_n$, also referred to as a system, storage system, etc. Each server $102_1$, $102_2$, $102_3$ ... $102_n$ manages a corresponding storage $104_2$, $104_3$ ... $104_n$, respectively, over a network 106. In one embodiment, data in the first storage $104_1$ is copied to second through nth storages $104_2$, $104_3$ ... $104_n$ in different servers $102_2$, $102_3$ ... $102_n$ as part of a series of cascading active copy relationships $400_1$ ... $400_{n-1}$, where there is an active copy relationship $400_i$ to copy updates to source storage i whose updates are copied to the (i+1) storage, for i=1 to n-1, in the cascade configuration.

The servers $102_1$, $102_2$ ... $102_{n-2}$ may further include one or more inactive copy relationships $500_{i,j}$, in which i is the source storage $104_i$ and j is the target storage $104_j$. Inactive copy relationships $500_{i,j}$ track updates to source storage $104_i$ that is also a source storage in another active copy relationships $400_i$ whose data is copied to the target storage $104_j$ through intermediate active copy relationships. Thus, the inactive copy relationship $500_{i,j}$ indicates updates to the source storage $104_i$ to be copied to the target storage $104_j$ via another active copy relationship.

In an alternative embodiment, the storages $104_2$, $104_3$ ... $104_n$ may all be in one storage server. Still further, there may be two or more storages to which the data from another storage is copied. The data subject to the copying from the first storage $104_1$ to the second through nth storages $104_2$, $104_3$ ... $104_n$ may comprise a volume or other logical unit. The host 100 and storage servers $102_1$, $102_2$, $102_3$ ... $102_n$ may communicate over the network 106. There may be additional hosts (not shown) that provide Input/Output (I/O) requests to the storages $104_1$, $104_3$ ... $104_n$.

In described embodiments, storages are described as a first storage, second storage, third storage . . . . , n-1th storage and nth storage, which indicates a storage order in which updates are cascaded from a first storage to a second storage to a third storage and serially all the way to the nth storage. The first storage $104_1$ may comprise a primary product volume to which data is copied to the other storages $104_2$ ... $104_n$.

The host system 100 includes a replication manager 108 to establish copy relationships 400, 500 between the different storages as shown by the active copy relationships $400_1$, $400_2$, $400_3$ ... $400_{n-1}$ and inactive copy relationships $500_{1,j}$, $500_{2,j}$, $500_{3,j}$ ... $500_{n-2}$. The active copy relationships $400_i$ are defined to synchronize/copy data from a source storage to a target storage, where for an active copy relationship $400_i$ data is synchronized from the source storage $104_i$ to a target storage $104_{i+1}$ for i=1 to n-1. An active copy relationship $400_2$, $400_3$ ... $400_{n-1}$ synchronizes data from the source storage to a target storage. Each storage $104_i$ may be the source of multiple active copy relationships $400_i$, to different target storages, to form a cascade or tree of copy relationships. An inactive copy relationship $500_{1,j}$, $500_{2,j}$, $500_{3,j}$ ... $500_{n-2,j}$ does not actively synchronize data, but indicates the source data of the inactive copy relationship to be synchronized to the target storage when the source storage of the inactive copy relationship is updated. In this way, when an inactive copy relationship is later activated, all the data indicated as updated or needing to be synchronized in the inactive copy relationship may be synchronized from the source to the target identified in the inactive copy relationship.

The host 100 further includes a failover/failback manager 110 to use to implement a failover and failback for a source and target storage of a copy relationship. A failover from a first volume to a second volume removes the first volume from the active copy relationship in which the first volume is a target volume. Further, a failback from the source volume to a target volume, removes that failback target volume as a source volume in another copy relationship in which the failback source volume is the target volume, but the failback target volume could be a source volume in copy relationships to target volumes other than the failback source volume.

Figure 2A:
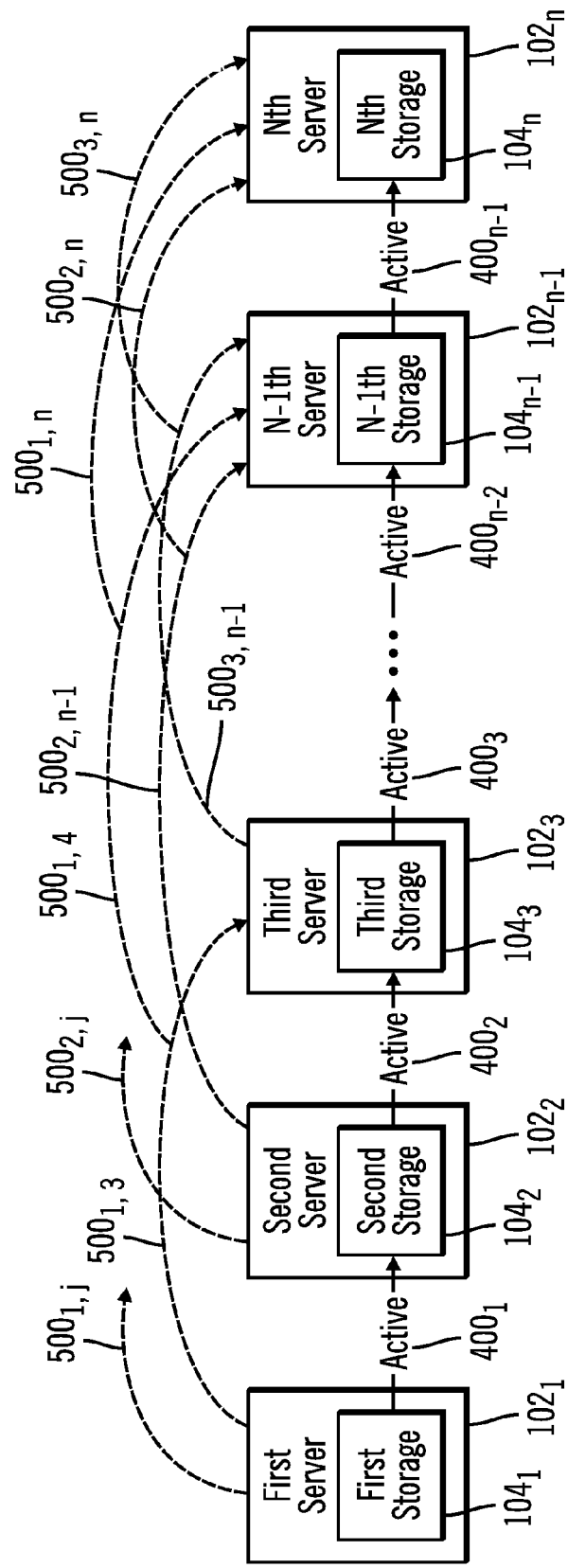
FIGS. 2a and 2b illustrate embodiments of cascaded configurations in the storage replication environment.

FIG. 2a illustrates an embodiment of a cascaded copy architecture where active copy relationships $400_1$, $400_2$, $400_3$ ... $400_{n-1}$ specify to copy data serially from the first through (n-1)th storages $104_1$ ... $104_{n-1}$ to the second through nth storages $104_2$ ... $104_n$, respectively. Further, the inactive copy relationships $500_{i,j}$ are shown with dashed lines, such that each storage $104_i$ whose data is indirectly copied to another storage, excluding the storage to which the data is directly copied as a result of the active copy relationship $400_i$ may have inactive copy relationships $500_{i,j}$ from the source storage $104_i$ to target storages $104_j$ not in the active copy relationship $400_i$. For instance, the first server $102_1$ may have inactive copy relationships $500_{1,3}$ ... $500_{1,n-1}$, $500_{1,n}$, where inactive copy relationship $500_{i,j}$ specifies a source storage i to copy to a target storage j. The second server $102_2$ may have inactive copy relationships $500_{2,4}$ ... $500_{2,n-1}$, $500_{2,n}$ and the third server $102_3$ may have inactive copy relationships $500_{3,5}$ ... $500_{3,n-1}$, $500_{2,n}$. As discussed, if the source storage in an active copy relationship fails, the inactive copy relationship may be activated to allow resynchronization to the target storage whose source failed. There are no inactive copy relationships for the n-1th and nth storages because there are no storages to which data from the storages $104_{n-1}$ and $104_n$ are indirectly copied outside of active copy relationships.

In certain embodiments, the total number of inactive copy relationships for any source storage $104_i$ whose data is actively copied to storage $104_{i+1}$ and indirectly copied to storages $104_{i+2} \ldots 104_n$, is n-(i+1) inactive copy relationships, where n is the total number of storages to which the data is copied. In this case, the total number of inactive copy relationships that may be created in the system is expressed by the equation (1) below:

(1)

$$\sum_{i=1}^{n-2} n - (i+1)$$

In alternative embodiments, data may be synchronized from an initial source to the storages in configurations other than a cascading configuration, which may result in a different number of possible inactive copy relationships, such that a source storage may be in as many inactive copy relationships as there are other storages to which the data from the source storage is indirectly copied following the active copy relationship of the source storage.

Figure 2B:
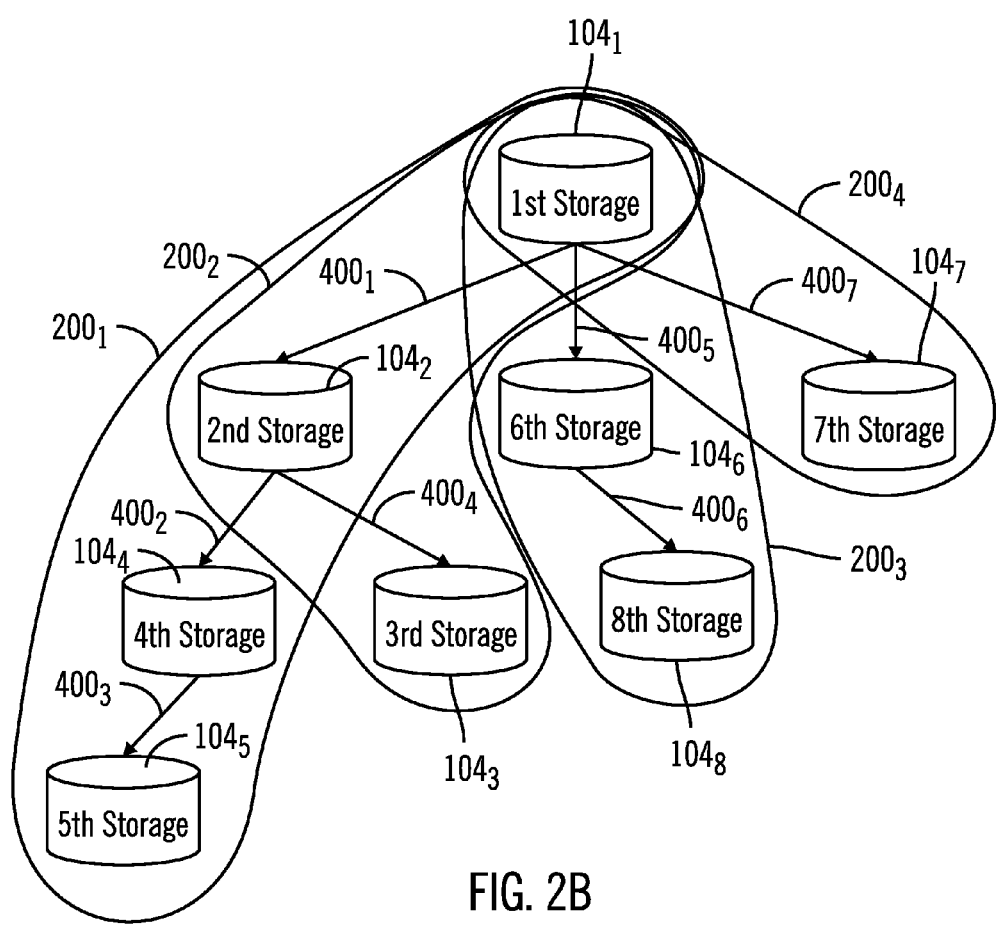

FIG. 2b shows another example of a cascade of copy relationships comprising a tree of cascaded storages, including four cascade groups $200_1$, $200_2$, $200_3$, and $200_4$ from the root storage $104_1$. In the example of FIG. 2b, cascade group $200_1$ includes storages $104_1$, $104_2$, $104_4$, and $104_5$, cascade group $200_2$ includes storages $104_1$, $104_2$, and $104_3$, cascade group $200_3$ includes storages $104_1$, $104_6$, $104_8$, and cascade group $200_4$ includes storages $104_1$ and $104_7$. Certain of the storages are overlapping storages, e.g., storages $104_1$ and $104_2$ in that they are included in multiple cascade groups $200_1$ and $200_2$, and other of the storages comprise non-overlapping storages, e.g., $104_3$, $104_4$, $104_5$, $104_6$, $104_8$, $104_7$ in that they are only in one cascade group. In the described embodiments, the different cascade groups form a tree of cascade groups by having a common root storage $104_1$, which receives data from one or more host systems (not shown).

In FIG. 2b, each cascade group $200_1$, $200_2$, $200_3$, and $200_4$ includes a plurality of active copy relationships to copy data serially through the storages in the cascade group, from storage-to-storage. For instance cascade group $200_1$ includes active copy relationships $400_1$, $400_2$, $400_3$ to copy data serially through the storages $104_1$, $104_2$, $104_4$, $104_5$; cascade group $200_2$ includes active copy relationships $400_1$, $400_4$ to copy data serially through the storages $104_1$, $104_2$, $104_3$; cascade group $200_3$ includes active copy relationships $400_5$, $400_6$ to copy data serially through the storages $104_1$, $104_6$, $104_8$; and cascade group $200_4$ includes active copy relationship $400_7$ to copy data serially through the storages $104_1$ and $104_7$.

Further, there may also be inactive copy relationships $500_{i,j}$ for each pair of storages in the tree of cascade groups, such that each storage $104_i$ whose data is indirectly copied to another storage, excluding the storage to which the data is directly copied as a result of the active copy relationship $400_i$ may have inactive copy relationships $500_{i,j}$ from the source storage $104_i$ to target storages $104_j$ not in the active copy relationship $400_i$. There may be inactive copy relationships between storages in the same cascade group and inactive copy relationships having source and target storages in different cascade groups. Further, there may be inactive copy relationships $500_{i,j}$ copying between non-overlapping storages that are only in one cascade group, such as from the third storage $104_3$ to the fourth storage $104_4$, from the third storage $104_3$ to the fifth storage $104_5$, from the fifth storage $104_5$ to the eight storage $104_8$, etc. For storages in different cascade groups $200_1$, $200_2$, $200_3$, and $200_4$, the inactive copy relationships may be in both directions, e.g., $500_{i,j}$ and $500_{j,i}$.

If the source storage in an active copy relationship fails, the inactive copy relationship may be activated to allow resynchronization to the target storage whose source failed. In certain embodiments, the total number of inactive copy relationships that may be formed between pairs of n storages in a tree of cascade groups , e.g., $200_1$, $200_2$, $200_3$, and $200_4$ , may comprise the total number of possible inactive copy relationships (which may be expressed as n*(n-1)) minus all active copy relationships, (which may be expressed as (n-1)) minus all upstream relationships within the same cascade group (which may be expressed as the sum of the levels of each of the nodes within the cascade group).

FIG. 2b provides one embodiment or example of a tree of cascade groups. In alternative implementations the tree of cascade groups can have any number of cascade groups and storages within the cascade groups.

Figure 3:
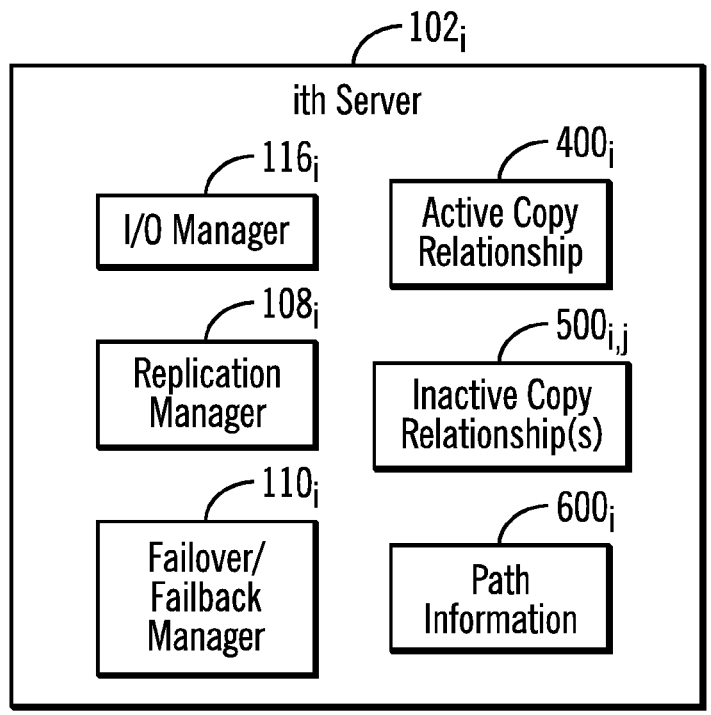
FIG. 3 illustrates an embodiment of a server in the storage replication environment.

FIG. 3 shows an embodiment of a server $102_1$, comprising one of the servers $102_1$, $102_2$, $102_3 \ldots 102_n$, as including an Input/Output (I/O) manager $116_i$ to manage I/O requests directed to the storage managed by the server $102_i$, a replication manager $108_i$ to replicate data to another target, and a failback/failover manager $110_i$ to manage failover and failback operations. The server failover/failback manager $110_i$ and replication manager $108_i$ may coordinate replication and failover/failback operations with the host 100. Further operations described as performed by any of the server failover/failback manager 110, $110_i$ may be performed by other components, including other failover/failback managers than those described. The failover/failback manager $110_i$ also establishes and terminates relationships as part of the failback and failover operations.

Each server $102_i$ further includes zero or more active copy relationships $400_i$ indicating a copy relationship in which the server $102_i$ is the source of a target server $102_j$ and inactive copy relationships $500_{i,j}$. The server $102_i$ may further include path information $600_i$ comprising indication of one or more paths with which the server $102_i$ is connected to directly upstream and/or downstream in the cascade of copy relationships.

In one embodiment, the active copy relationships $400_i$ are created by the replication manager 108 in the host 100 and the inactive copy relationships 500 are created by the replication manager $108_i$ on the server $102_i$.

The servers $102_1 \ldots 102_n$ may comprise an enterprise storage controller/server suitable for managing access to attached storage devices, such as, but not limited to, the International Business Machines Corporation's ("IBM") DS8000® storage system or other vendor storage servers known in the art. (DS8000 is a registered trademark of IBM in countries throughout the world).

In one embodiment, the replication manager 108, 108, comprises a program for managing the mirroring of volumes across systems, such as, but not limited to, the IBM mirroring programs Geographically Dispersed Parallel Sysplex® (GDPS)®, and Tivoli® Storage Productivity Center for Replication (TPC-R) that define a replication session and copy pairs. Different types of techniques may be selected to copy the data, such as synchronous mirroring, asynchronous mirroring or point-in-time copying, or combinations of multiple of these different mirroring types. The failover/failback manager 110, $110_i$ may comprise a program suitable for handling failover and failback operations, such as, but not limited to, the IBM HyperSwap product which establishes failover sessions from the established copy pairs. (Geographically Dispersed Parallel Sysplex, GDPS, Tivoli, and HyperSwap are registered trademarks of IBM in countries throughout the world).

The network 106 may comprise a Storage Area Network (SAN), Local Area Network (LAN), Intranet, the Internet, Wide Area Network (WAN), peer-to-peer network, wireless network, arbitrated loop network, etc. The storages $104_1$, $104_2$, $104_3$ ... $104_n$ may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, such as servers, storages, active and inactive copy relationships, etc., are shown, there may be any number of these components.

Figure 4:
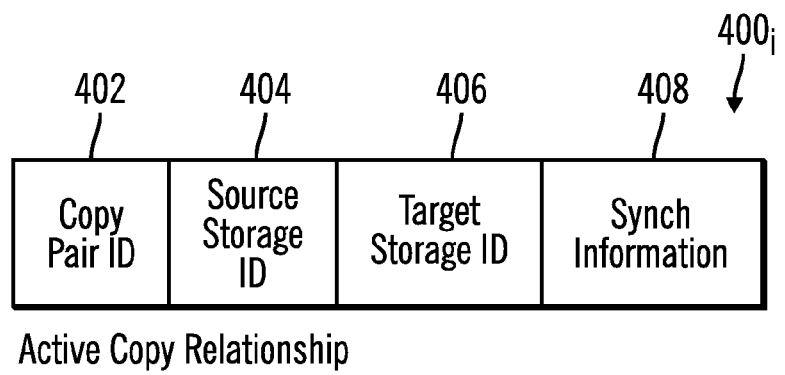
FIG. 4 illustrates an embodiment of an active copy relationship.

FIG. 4 illustrates an embodiment of an instance of an active copy relationship $400_i$, e.g., active copy relationships $400_1$, $400_2$ . . . . $400_{n-1}$, for which data is actively and currently being synchronized as including a copy pair identifier (ID) 402; a source storage identifier (ID) 404, e.g., as a volume or other logic unit identifier, from which data is synchronized/copied; a target storage ID 406, e.g., a volume or other logic unit identifier, to which data is synchronized; and synchronization information 408 indicating data units or tracks in the source storage 404 that need to copied or synchronized to the target storage 406.

Figure 5:
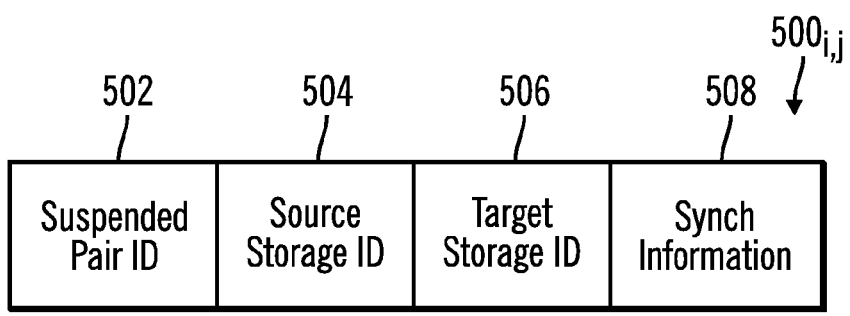
FIG. 5 illustrates an embodiment of an inactive copy relationship.

FIG. 5 illustrates an embodiment of a suspended or inactive copy relationship $500_{i,j}$ as including a suspended pair ID 502 identifying the inactive copy relationship; a source storage ID 504 identifying the source storage $104_i$ from which data will be synchronized when the inactive copy relationship is activated; a target storage ID 506 identifying the target storage $104_j$ to which the source data 504 is copied; and synchronization information 508 indicating data units that need to be copied from the source storage 504 to the target storage 506. The synchronization information 508 may comprise two bitmaps that are toggled as described below.

The synchronization information 408, 508 may comprise bitmaps having array of cells, where each cell indicates one of the data units subject to the copy relationship. In alternative embodiments, the bitmaps may comprise other types of data structures other than arrays used to indicate data units of the copy relationship that have been updated and that need to by synchronized to the target. To toggle bitmaps for the inactive copy relationships, two bitmaps are provided, a previous bitmap for the inactive copy relationship indicates data units that need to be copied from the source storage to the second storage as a result of write operations to the source storage during a previous interval, i.e., previous point-in-time. A current bitmap indicates data units that need to be copied from the source storage to the target storage as a result of write operations to the source storage during a current interval following the previous interval. The toggling may be triggered when all updates from the previous interval indicated in the previous bitmap have been copied from the source storage to the target storage.

To perform the toggling, the previous bitmap for the inactive copy relationship $500_{i,j}$ is discarded. A previous pointer for the previous bitmap is then set to point to the current bitmap for the inactive copy relationship $500_{i,j}$ and a current pointer for the current bitmap is set to point to a new bitmap initialized to indicate nothing to copy, e.g., all zeroes, is allocated. Updates to the source storage following the toggling are then indicated in the new bitmap addressed by the current pointer. In this way, the bitmaps are toggled by adjusting the pointer for the previous bitmap to point to the data structure of the current bitmap, and the pointer for the current bitmap would be adjusted to point to a new empty bitmap.

In one embodiment, the replication manager 108 may toggle the bitmaps of each inactive copy relationship $500_{i,j}$ by sending a message to all the replication managers $108_i$ on other storage servers $102_2$, $102_3$ ... $102_n$ to have them toggle any inactive copy relationship bitmaps they manage having a source storage that comprises the target storage of the active copy relationship $400_i$ whose updates from the previous bitmap, i.e., previous interval, have been synchronized.

Figure 6:
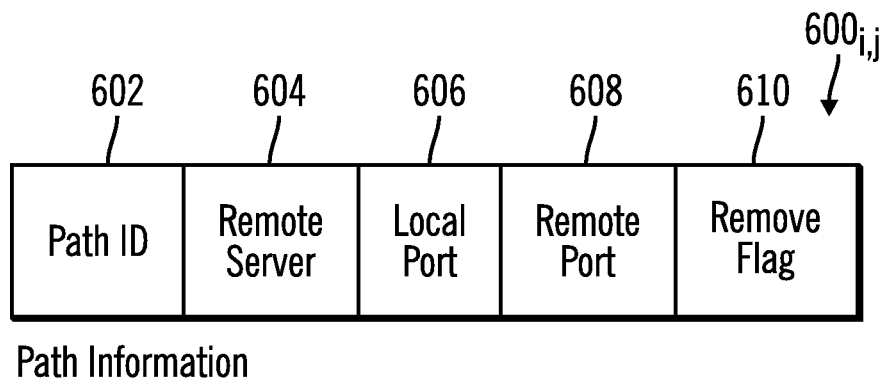
FIG. 6 illustrates an embodiment of path information for a path between two servers in the replication environment.

FIG. 6 illustrates an embodiment of an instance of path information $600_{i,j}$ for one of the servers $102_i$ indicating a path identifier (ID) 602; a remote server 604 comprising another server $102_j$ with which server $102_i$ is directly connected; a local port 606 at the server $102_i$ used in the path and a remote port 608 on the connected remote server 604 used for the path.

In certain embodiments, each server $102_i$ in a cascade relationship such as in FIGS. 2a and 2b, will have at least one instance of path information $600_{i,j}$ for a downstream path which is used for an active copy relationship $400_1$ for server $102_i$ functioning as a source server copying data to a target storage and/or for an upstream path which is used by the server $102_i$ functioning as the target of an active copy relationship $400_i$ to communicate with the upstream source server. To communicate with a server more than one level away in the cascade from the immediate servers connected according to the path information $600_{i,j}$, the communication server $102_i$ would have to forward messages to pass through the immediately connected servers so they could forward toward the recipient server of the communication on reverse or forward paths.

Figure 7:
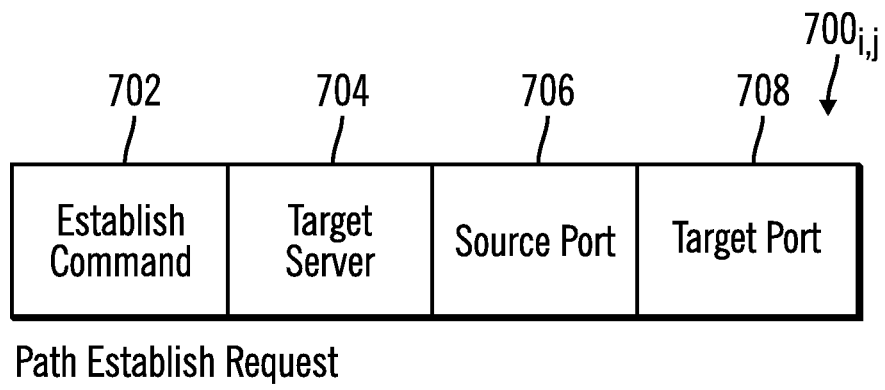
FIG. 7 illustrates an embodiment of a path establish request to establish a path from a source storage to a target storage in an active copy relationship.
Figure 8:
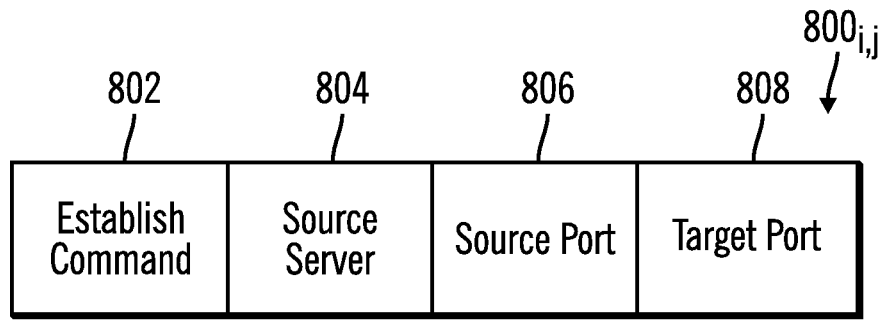
FIG. 8 illustrates an embodiment of a reverse path establish request to establish a path from a target storage to a source storage in the active copy relationship.

FIG. 7 illustrates an embodiment of path establish request $700_{i,j}$, which may be sent by the host 100 or some other system to a source server $102_i$ of an active copy relationship $400i$ to establish a path to the target server $102_j$ of the active copy relationship 400. The path establish request $700_{i,j}$ indicates the establish command 702 operation code; a target server 704 of the active copy relationship; and a pair of ports 706 and 708 at the source server $102_i$ and the specified target server 704, respectively, to use for the path to establish FIG. 8 illustrates an embodiment of a reverse path establish request $800_{j,i}$ sent by the source server $102_i$, which received the path establish request $700_{i,j}$, to the target server $102_j$ to establish a reverse path, which may comprise a mono-directional path, from the target server $102_j$ to the source server $102_i$. The reverse path establish request $800_{j,i}$ may include the establish command op code 802; the source server 804 for the path; and a pair of ports 806 and 808 at the specified source server 804 and the target server $102_j$, respectively, to use for the reverse path to establish.

Figure 9:
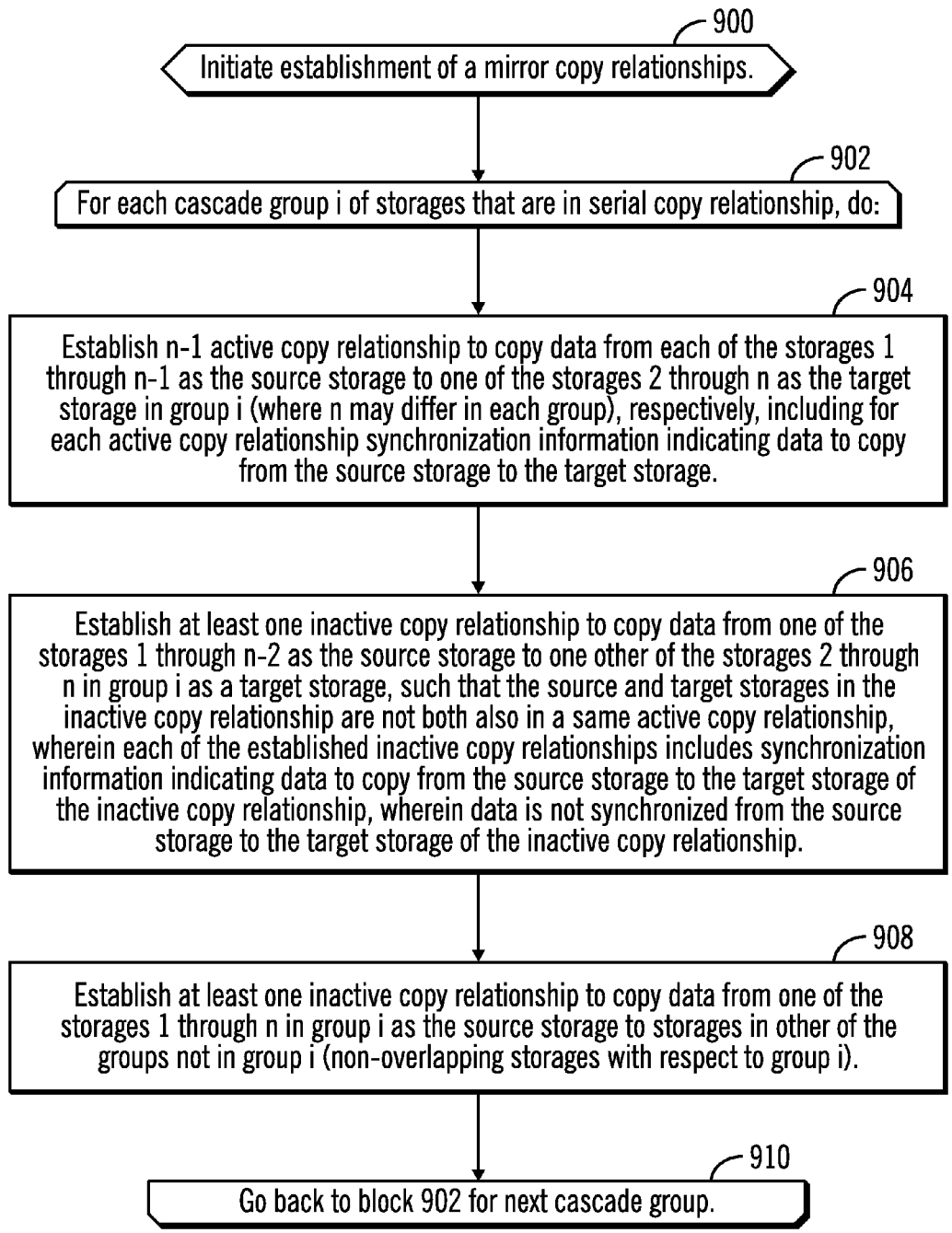
FIG. 9 illustrates an embodiment of operations to establish mirror copy relationships.

FIG. 9 illustrates an embodiment of operations performed by the replication manager 108, $108_i$ to establish the active copy relationships $400_1 \ldots 400_{n-1}$ to implement the cascaded synchronizing operations and the inactive copy relationships $500_1$. These operations of FIG. 9 may each be initiated in response to user entered establish commands via a user interface of the replication manager 108, $108_i$ or automatically executed as part of a script program including the mirror copy relationship establish commands. Upon initiating (at block 900) the operations to establish mirror copy relationships $400_i$, the replication manager 108, $108_i$ performs a loop of operations at blocks 902 through 910 for each cascade group i, e.g., cascade groups $200_1$, $200_2$, $200_3$, and $200_4$ in FIG. 2b or just a single cascade group as in FIG. 2a. At block 904, n–1 active copy relationships $400_1 \ldots 400_{n-1}$ are established to copy data from each of the storages $104_1$ through $104_{n-1}$ in cascade group i as the source storage to one of the storages $104_2$ through $104_n$ as the target storage in the cascade group i, respectively. For each created active copy relationship $400_1 \ldots 400_{n-1}$, including synchronization information 408 is generated indicating data to copy from the source storage to the target storage, including updates that need to be synchronized. The variable n may have different values in each of the cascade groups, depending on how many storages are in the cascade group.

The replication manager 108, $108_i$ may further establish (at block 906) at least one inactive copy relationship $500_{i,j}$ to copy data from one of the storages $104_1$ through $104_{n-2}$ as the source storage i to one other of the storages $104_2$ through $104_n$ as a target storage j, such that the source $104_i$ and target storages $104_j$ in the inactive copy relationship $500_{i,j}$ are not both also in a same active copy relationship. Each of the established inactive copy relationships $500_{i,j}$ includes synchronization information 508 indicating data to copy from the source storage $104_i$ to the target storage $104_j$ of the inactive copy relationship. After the inactive copy relationship $500_{i,j}$ is established, data is not synchronized from the source storage $104_i$ to the target storage $104_j$ of the inactive copy relationship, but the synchronization information is updated to indicate data that still needs to be synchronized.

The replication manager 108, $108_i$ may establish (at block 908) at least one inactive copy relationship $500_{i,j}$ to copy data from one of the storages 1 through n in group i as the source storage to storages in other of the groups not in group i (non-overlapping storages with respect to group i), where there may be one inactive copy relationship between the source storage and each of the storages that are only within one other group, i.e., non-overlapping storages not in cascade group i.

In implementations, where there is only one cascade group, such as in FIG. 2a, then only one loop of operations is performed from blocks 904 to 908.

Figure 10:
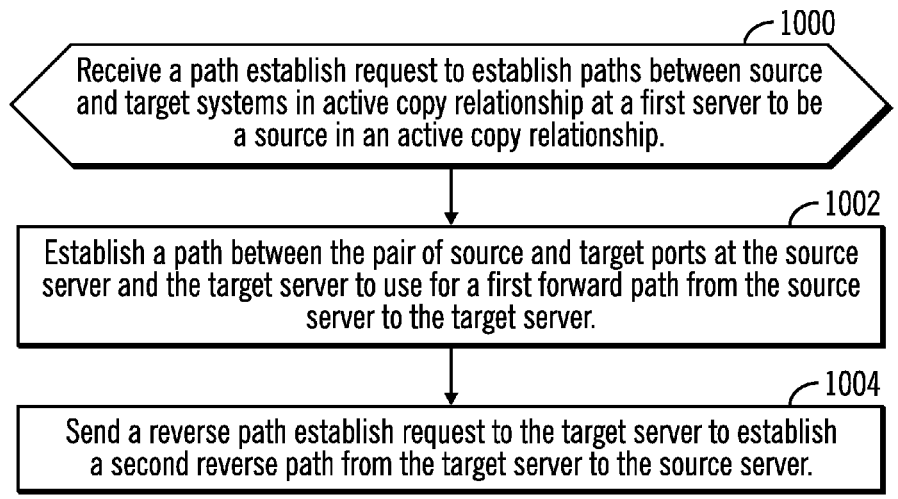
FIG. 10 illustrates an embodiment of operations to process a path establish request to establish a path between a source server and target server in an active copy relationship.

FIG. 10 illustrates an embodiment of operations performed by a source server $102_S$, also referred to as a first system, in an active copy relationship $400_S$ to establish a forward path, also referred to as a first path, upon receiving a path establish request $700_{S,T}$ with the target server $102_T$, also referred to as a second system. The operations of FIG. 10 may be performed by the replication manager $108_S$ or some other component in the source server $102_S$. Upon receiving (at block 1000) the path establish request $700_{S,T}$, the source server $102_S$, establishes (at block 1002) a path between the pair of source 706 and target ports 708 at the source server $102_S$ and the target server $102_T$, respectively, to use for a first forward path from the source server $102_S$ to the target server $102_T$. The source sever $102_S$ sends (at block 1004) a reverse path establish request 800 to the target server $102_T$ to establish a reverse path, also referred to as a second path, from the target server $102_T$ to the source server $102_S$. The two established paths, forward and reverse, may comprise mono-directional paths.

Figure 11:
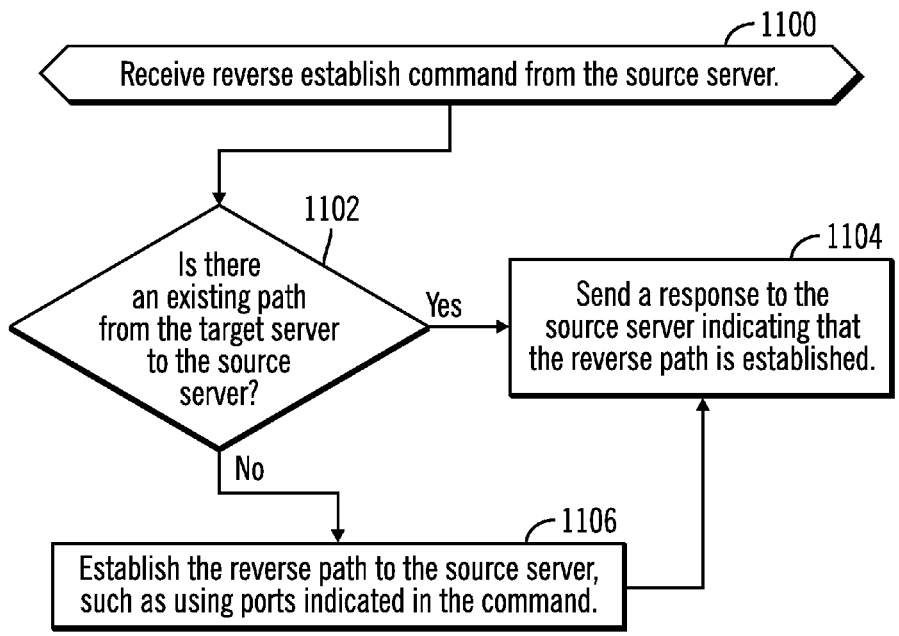
FIG. 11 illustrates an embodiment of operations to process a reverse path establish request to establish a reverse path between a target and source server in an active copy relationship.

FIG. 11 illustrates an embodiment of operations performed by the target server $102_T$ to establish a reverse path upon receiving a reverse path establish request $800_{T,S}$ from the source server $102_S$ for an active copy relationship $400_i$. The operations of FIG. 11 may be performed by the replication manager $108_T$ or some other component in the target server $102_T$. Upon receiving (at block 1100) a reverse path establish request $800_{T,S}$, if (at block 1102) there is already a path $600_{T,S}$, such as a mono-directional path from the target server $102_T$ to the source server $102_S$, then the target server $102_T$ sends (at block 1104) a response to the source server $102_S$ indicating that the reverse path $600_{T,S}$ is established. If (at block 1102) there is no existing path to the source server $102_S$, then the target server $102_T$ establishes (at block 1106) the reverse path $600_{T,S}$ to the source server $102_S$, such as by using the source 806 and target 808 ports indicated in the request $800_{T,S}$, which may be the same paths used for the forward path $600_{S,T}$ from the source server $102_S$ to the target server $102_T$.

Figure 12:
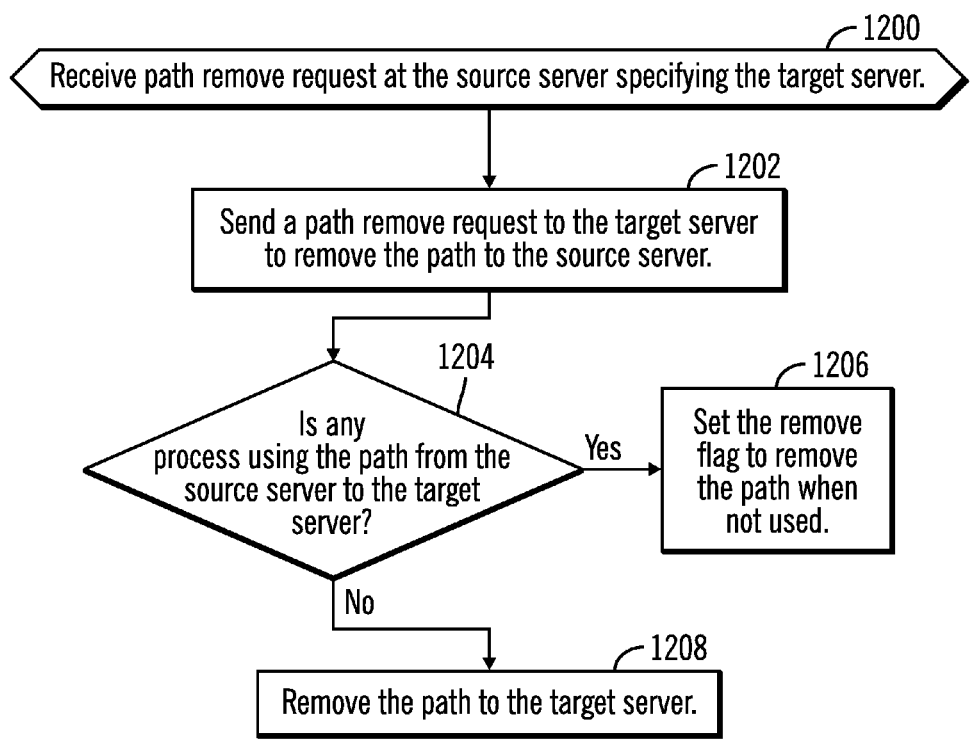
FIG. 12 illustrates an embodiment of operations to process a path remove request at a source server.

FIG. 12 illustrates an embodiment of operations performed by a source server $102_S$ upon receiving a path remove request specifying a target server $102_T$ for the path removal. The operations of FIG. 12 may be performed by the replication manager $108_S$ or some other component in the source server $102_S$. Upon receiving (at block 1200) the path remove request, the source server $102_S$ sends (at block 1202) a path remove request to the target server $102_T$ to remove the reverse path $600_{T,S}$ to the source server $102_S$. If (at block 1204) any process is using the forward path $600_{S,T}$, then the source server $102_S$ sets (at block 1206) the remove flag 610 to remove the path $600_{S,T}$ when not used. If (at block 1204) the forward path is not being used, then the source server $102_S$ removes (at block 1208) the path, such as by removing the path information $600_{S,T}$ for the forward path.

The target server $102_T$ upon receiving the path remove request from the source server $102_S$ at block 1202 would perform the operations at blocks 1204, 1206, and 1208 to remove a reverse path information $600_{T,S}$ for the reverse path from the target server $102_T$ to the source server $102_S$.

Figure 13:
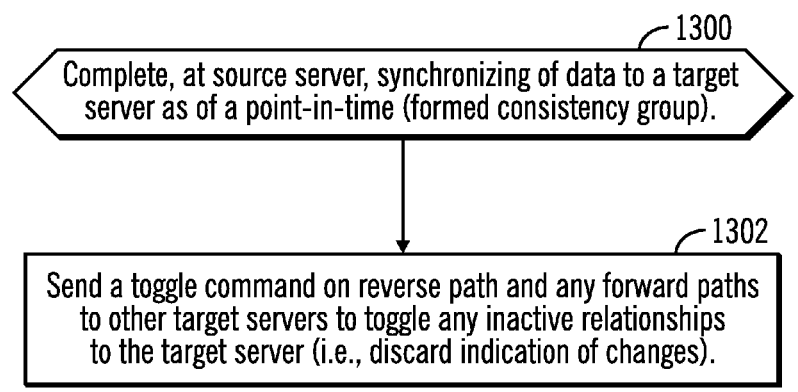
FIG. 13 illustrates an embodiment of operations for a server to send a toggle command when completing synchronization to a target server.

FIG. 13 illustrates an embodiment of operations performed by a source server $102_S$, such as by the replication manager $108_S$ or other software, upon completing synchronization of data and updates to a target server $102_T$ as part of an active copy relationship $400_S$. Upon completing (at block 1300) the synchronizing of data to the target server $102_T$ as of a point-in-time to form a consistency group of data at the target server $102_T$ consistent as of a point-in-time, the source server $102_S$ sends (at block 1302) a toggle command on reverse path and any forward paths to other target servers to toggle a bitmap of current changes for any inactive relationships 500 to the target server $102_T$. The toggle command is to cause the server $102_i$ receiving the command on the reverse path to discard any indication of changes as of the point-in-time in synchronization information 508 in any inactive copy relationships $500_S$ having the target server $102_T$ indicated in the target storage 506 (FIG. 5) of the inactive copy relationship $500_{S,T}$. The toggle command may indicate the target server that is synchronized as well as a point-in-time, so that the server receiving the toggle command can discard any changes in synchronization information 508 for inactive copy relationships as of the indicated point-in-time.

Figure 14:
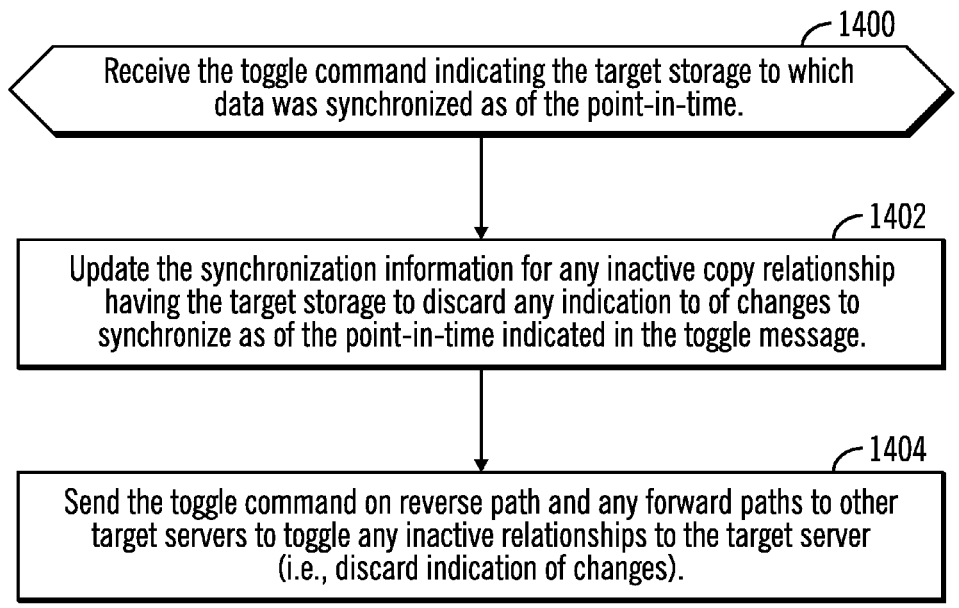
FIG. 14 illustrates an embodiment of operations for a server to process a toggle command from another server with respect to a target server being synchronized as of a point-in-time.

FIG. 14 illustrates an embodiment of operations performed by a server $102_i$, such as by the replication manager $108_S$ or other software, receiving a toggle command on a reverse path. Upon receiving (at block 1400) the toggle command indicating the target server $102_T$ to which data was synchronized as of an indicated point-in-time, the server $102_i$ updates (at block 1402) the synchronization information 508 for any inactive copy relationship $500_{i,T}$ having the target server $102_T$ identified in the toggle command to discard any indication in the synchronization information 508 of changes to synchronize as of the point-in-time indicated in the toggle message. The receiving server $102_i$ further sends (at block 1302) the toggle command on a reverse path and any forward paths to other target servers to cause other connected servers to toggle their bitmaps or synchronization information 508 of changes for any inactive relationships $500_{i,T}$ to the target storage $102_T$ as of the indicated point-in-time. In this way, the toggle command can propagate throughout cascade groups in a serial arrangement such as FIG. 2 or a tree of cascade groups by forwarding the command on any configured reverse or forward paths from the server $102_i$ receiving the toggle command.

If the synchronization information 508 includes a previous bitmap of changes indicated in a previous point-in-time and a current bitmap indicating change occurring during the current point-in-time period, then the toggle command may cause the receiving server $102_i$ to discard the previous bitmap, having the changes as of the previous point-in-time, indicate the current bitmap having the current changes as a previous bitmap having changes in the point-in-time period following the point-in-time indicated in the toggle command, and create a new current bitmap to indicate changes received in the current point-in-time period.

Figure 15:
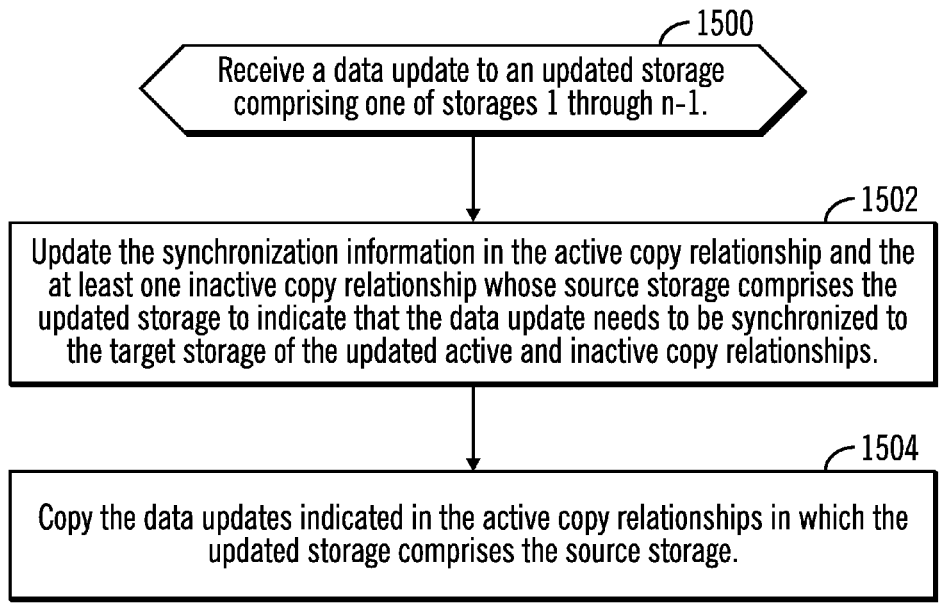
FIG. 15 illustrates an embodiment of operations to process an update to data at the source storage in an active copy relationship.

FIG. 15 illustrates an embodiment of operations by the I/O manager 116 and/or replication manager 108, $108_i$ to process an update to storage $104_i$ comprising one of the storages $104_1 \ldots 104_n$. The operations may be performed by the replication manager $108_i$ in the server $102_i$ including the storage $104_i$ that was updated, which may comprise a primary/production server or another server. Upon receiving (at block 1500) the update to the data in the storage $104_i$, the synchronization information 408 for the active copy relationship $400_i$ and each of the inactive copy relationships $500_{i,j}$ whose source storage comprises the updated storage $104_i$ (at block 1502) to indicate that the updated data needs to be synchronized to the target storage of the updated active $400_i$ and inactive $500_{i,j}$ copy relationships. The replication manager $108_i$ copies (at block 1504) the update to the data in the source storage $104_i$ to the target storage $104_j$ indicated in the active copy relationship $400_i$. However, the inactive copy relationships do not cause the copying of the updated data to the target storages $104_j$ indicated in the inactive copy relationships $500_{i,j}$.

With the operations of FIG. 15, the synchronization information 508 in the inactive copy relationships $500_{i,j}$ are updated to indicate updated data in the storage $104_i$, so that when the inactive copy relationship $500_{i,j}$ is activated and used for resynchronization as part of a failback procedure, the updated data will be synchronized to or from the target storage of the activated inactive copy relationship to ensure proper resynchronization of the storage's data.

Figure 16:
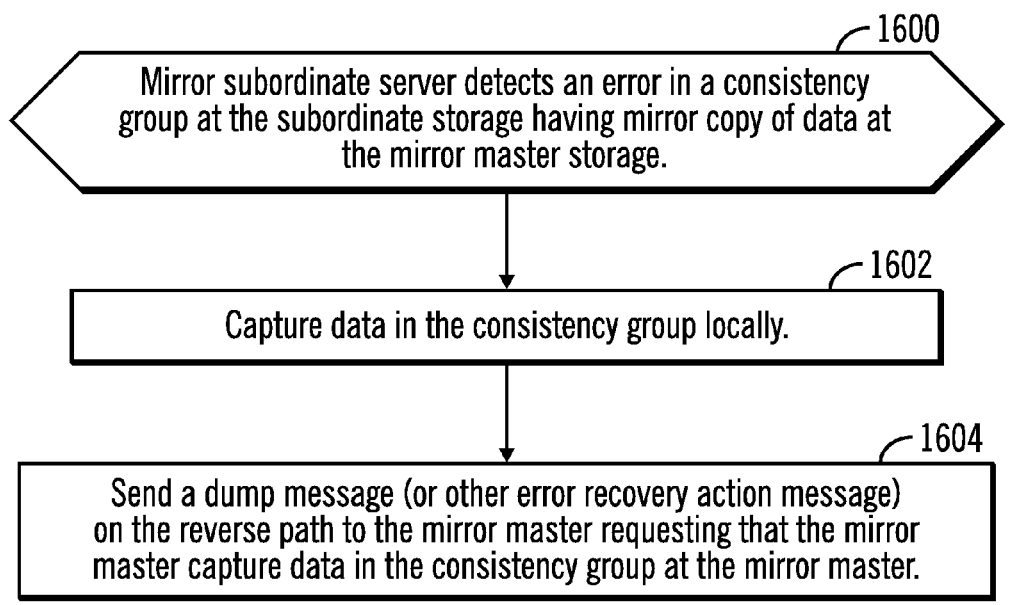
FIG. 16 illustrates an embodiment of operations for a mirror subordinate to handle a detected error in a consistency group.

FIG. 16 illustrates an embodiment of operations to perform when one of the servers $102_{Su}$ comprises a subordinate server in a mirror copy relationship to a mirror master server $102_M$. The master and subordinate may have established forward and reverse paths established when the master and subordinate mirror copy relationship is established using the path establish operations described above. Upon (at block 1600) the mirror subordinate server $102_{Su}$ detecting an error in a consistency group of data at a subordinate storage $104_{Su}$ having a mirror copy of data at the master storage $104_M$, the subordinate server $102_{Su}$ captures (at block 1602) data in the consistency group locally and sends (at block 1604) a dump message on the reverse path to the mirror master server $102_M$ requesting the mirror master $102_M$ capture data in the consistency group at the mirror master storage $104_M$. Other recovery actions than the dump at block 1604 may be taken, such as recreating a mirror session between the mirror subordinate server $102_{Su}$ and the mirror master $102_M$, informing the mirror master $102_M$ when a synchronization or point-in-time copy completed, etc.

Described embodiments provide techniques to form a reverse path between a source and target (active or inactive), or subordinate and master. The source server of an active copy relationship may forward information, when its target storage in an active copy relationship at the target server has been synchronized, to other servers through the reverse and forward paths so that other servers may update synchronization information in inactive copy relationships having the target storage that was synchronized.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIGS. 1 and 3, including the hosts 100 and storage servers $102_1$, $102_2$ ... $102_i$ ... $102_n$ may be implemented in one or more computer systems, such as the computer system 1702 shown in FIG. 17. Computer system/server 1702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1702 may be practiced in distributed cloud computing environments where tasks are performed by remote processing devices that are linked through a communications network. In a distributed cloud computing environment, program modules may be located in both local and remote computer system storage media including memory storage devices.

Figure 17:
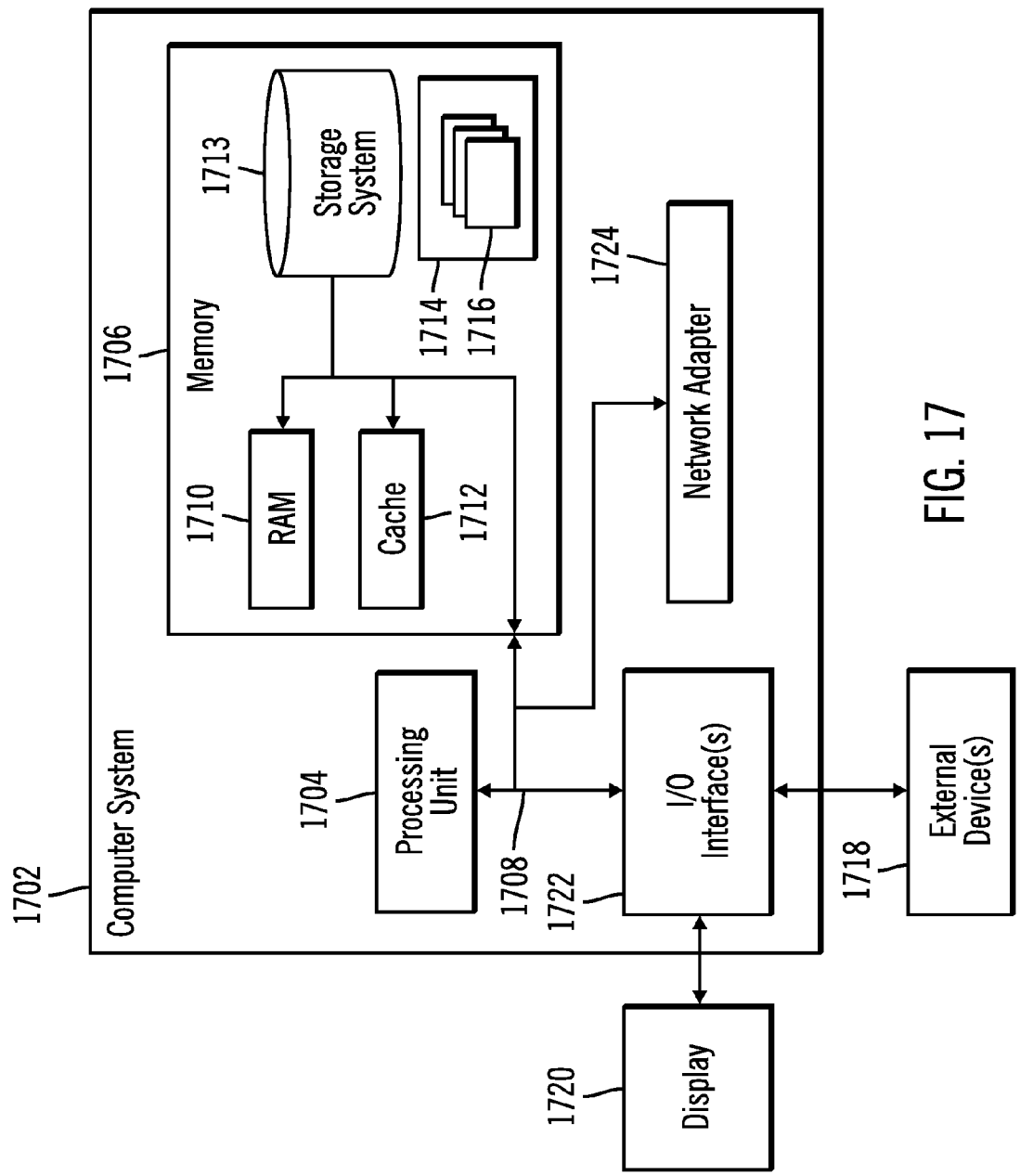
FIG. 17 illustrates a computing environment in which the components of FIG. 1 may be implemented.

As shown in FIG. 17, the computer system/server 1702 is shown in the form of a general-purpose computing device. The components of computer system/server 1702 may include, but are not limited to, one or more processors or processing units 1704, a system memory 1706, and a bus 1708 that couples various system components including system memory 1706 to processor 1704. Bus 1708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1702 typically includes a variety of computer system readable media. Such media may be any available media that is accessible by computer system/server 1702, and it includes both volatile and non-volatile media, removable and non-removable media.

System memory 1706 can include computer system readable media in the form of volatile memory, such as random access memory (RAM) 1710 and/or cache memory 1712. Computer system/server 1702 may further include other removable/non-removable, volatile/non-volatile computer system storage media. By way of example only, storage system 1713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1708 by one or more data media interfaces. As will be further depicted and described below, memory 1706 may include at least one program product having a set (e.g., at least one) of program modules that are configured to carry out the functions of embodiments of the invention.

Program/utility 1714, having a set (at least one) of program modules 1716, may be stored in memory 1706 by way of example, and not limitation, as well as an operating system, one or more application programs, other program modules, and program data. Each of the operating system, one or more application programs, other program modules, and program data or some combination thereof, may include an implementation of a networking environment. The components of the computer 1702 may be implemented as program modules 1716 which generally carry out the functions and/or methodologies of embodiments of the invention as described herein. The systems of FIG. 1 may be implemented in one or more computer systems 1702, where if they are implemented in multiple computer systems 1702, then the computer systems may communicate over a network.

Computer system/server 1702 may also communicate with one or more external devices 1718 such as a keyboard, a pointing device, a display 1720, etc.; one or more devices that enable a user to interact with computer system/server 1702; and/or any devices (e.g., network card, modem, etc.) that enable computer system/server 1702 to communicate with one or more other computing devices. Such communication can occur via Input/Output (I/O) interfaces 1722. Still yet, computer system/server 1702 can communicate with one or more networks such as a local area network (LAN), a general wide area network (WAN), and/or a public network (e.g., the Internet) via network adapter 1724. As depicted, network adapter 1724 communicates with the other components of computer system/server 1702 via bus 1708. It should be understood that although not shown, other hardware and/or software components could be used in conjunction with computer system/server 1702. Examples, include, but are not limited to: microcode, device drivers, redundant processing units, external disk drive arrays, RAID systems, tape drives, and data archival storage systems, etc.

The reference characters used herein, such as i, j, k, and n, and any other variables, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for establishing paths between a first system having a first storage, a second system having a second storage, and a third system, wherein the computer program product comprises a computer readable storage medium having program instructions embodied therewith, when executed cause operations, the operations comprising:

initiating a path establish request operation to establish a first path between the first system and the second system for a first copy relationship to copy data from the first storage to the second storage managed by the second system;

in response to the path establish request, establishing a pair of ports at the first system and the second system to use for the first path from the first system to the second system to copy data from the first storage to the second storage;

sending, by the first system, a reverse path establish request to the second system to establish a second path from the second system to the first system, wherein the second system sends a command to the first system on the second path for the third system;

establishing, by the second system, a second copy relationship from the second storage to a third storage managed by the third system; and in response to copying data as of a point-in-time from the second storage to the third storage, sending, by the second system, the command on the second path to the first system to cause the first system to discard indication of changes at the first storage for a third copy relationship with the third storage prior to the point-in-time.

2. The computer program product of claim 1, wherein the first and second paths comprise mono-directional paths, wherein the operations further comprise:
   determining, at the second system, whether an existing mono-directional path exists from the second system to the first system in response to receiving the reverse path establish command;
   using, by the second system, the existing mono-directional path for the second path in response to determining the existing mono-directional path; and
   establishing the second path from the second system to the first system using the pair of ports; and
   sending, by the second system, a response message from the second system indicating that the second system established the second path.

3. The computer program product of claim 1, wherein the operations further comprise:
   receiving, at the first system, a path remove request specifying the second system; and
   in response to the path remove request, performing:
      sending, by the first system, a path remove message to the second system to cause the second system to remove the second path; and
      removing, by the first system, the first path.

4. The computer program product of claim 3, wherein the removing of the first path and the second path comprises:
   in response to the path remove request, determining, by the first system, whether the first path is being used;
   removing the first path in response to determining that the first path is not being used; and
   setting a first flag indicting to remove the first path after the first path is no longer being used in response to determining that the first path is being used, wherein the second path in response to the path remove message removes the second path if the second path is not being used and sets a second flag to indicate to remove the second path after the second path is no longer being used.

5. The computer program product of claim 1, wherein the command sent on the second path by the second system in response the copying of the data as of the point-in-time from the second storage to the third storage comprises a toggle command to cause the first system to discard a first bitmap indicating first changes as of the point-in-time, indicate a second bitmap indicating second changes following the point-in-time as being a previous bitmap, and creating a current bitmap to indicate third changes following the second changes indicated in the previous bitmap to copy to the third storage.

6. The computer program product of claim 1, wherein the operations further comprise:
   establishing, by the first system, the third copy relationship as an inactive copy relationship to copy data in the first storage to the third storage, wherein data is not synchronized from the first storage to the third storage in the inactive copy relationship, and wherein the inactive copy relationship indicates changes to data in the first storage to copy from the first storage to the third storage.

7. The computer program product of claim 1, wherein the operations further comprise:
   establishing, by a fourth system, an inactive copy relationship to copy data in a fourth storage to the third storage, wherein data is not synchronized from the fourth storage to the third storage in the inactive copy relationship, and wherein the inactive copy relationship indicates to copy data from the fourth storage to the third storage; and
   forwarding, by the first system, the command from the second system to the fourth system on at least one additional path to cause the fourth system to discard indication of changes at the fourth storage in its copy relationship with the third storage prior to the point-in-time.

8. The computer program product of claim 7, wherein the at least one additional path between the first system and the fourth system comprises at least one path established using a reverse path establish command to establish a reverse path from a target server to a source server of a copy relationship that is sent in response to establishing a forward path from the source server to the target server.

9. The computer program product of claim 8, wherein the first, second, third, and fourth storages are in active copy relationships, including the first and second copy relationships, to serially copy data from a source storage to a target storage of each of the active copy relationships, including copying data from the fourth storage to the first storage, from the first storage to the second storage and from the second storage to the third storage, wherein for each of the active copy relationships there is a forward path and a reverse path using the reverse path establish command between the source server and the target server of the active copy relationship.

10. The computer program product of claim 8, wherein the first, second and third storages are in a first group of active copy relationships to serially copy data among the storages in the first group, and wherein the fourth storage is in a second group of active copy relationships among storages in the second group, wherein at least one of the storages in both the first group and the second group comprise overlapping storages that are members of both the first and second groups, wherein at least one of the storages in both the first and second groups comprise non-overlapping storages that are a member of only one of the first and second groups, and wherein for each of the active copy relationships in the first and second groups there is a forward path and a reverse path using the reverse path establish command between the source server and the target server of the active copy relationship.

11. The computer program product of claim 1, wherein the second system is defined as a mirror subordinate to the first system comprising a mirror master, wherein data at the mirror master and the mirror subordinate are within a consistency group where data is mirrored from the mirror master and the mirror subordinate to respective target storages to be consistent as of a point-in-time, wherein the first and second paths are established when establishing a mirror session comprising the mirror master and the mirror subordinate, wherein the operations further comprise: and
   in response to an event at the mirror subordinate, capturing data in the consistency group at the mirror subordinate locally and sending an error recovery action message on the second path to the mirror master requesting that the mirror master capture data in the consistency group at the mirror master.

12. The computer program product of claim 1, wherein the operations further comprise:
   sending, by the second system, a message to the first system on the second path; and
   in response to not receiving a response to the message sent on the second path, sending, by the second system, an incremented sequence number to the first system, wherein upon receiving the incremented sequence number, the first system only accepts message having a sequence number greater than the incremented sequence number, which causes the first system to reject messages from the second system having a sequence number not greater than the incremented sequence number.

13. The computer program product of claim 1, wherein the second system sends the command to the third system on a third path concerning the second copy relationship between the third storage at the third system and the second storage.

14. A system, comprising:
a first system having a first storage;
a second system having a second storage;
a third system having a third storage,
wherein the first system performs operations, the operations comprising:
initiating a path establish request operation to establish a first path between the first system and the second system for a first copy relationship to copy data from the first storage to the second storage managed by the second system;
in response to the path establish request, establishing a pair of ports at the first system and the second system to use for the first path from the first system to the second system to copy data from the first storage to the second storage;
sending a reverse path establish request to the second system to establish a second path from the second system to the first system, wherein the second system sends a command to the first system on the second path for a third system,
wherein the second system performs operations, the operations comprising:
establishing a second copy relationship from the second storage to a third storage managed by the third system; and
in response to copying data as of a point-in-time from the second storage to the third storage, sending the command on the second path to the first system to cause the first system to discard indication of changes at the first storage for a third copy relationship with the third storage prior to the point-in-time.

15. The system of claim 14, wherein the command sent on the second path by the second system in response the copying of the data as of the point-in-time from the second storage to the third storage comprises a toggle command to cause the first system to discard a first bitmap indicating first changes as of the point-in-time, indicate a second bitmap indicating second changes following the point-in-time as being a previous bitmap, and creating a current bitmap to indicate third changes following the second changes indicated in the previous bitmap to copy to the third storage.

16. The system of claim 14, wherein first system further performs operations comprising:
establishing the third copy relationship as an inactive copy relationship to copy data in the first storage to the third storage, wherein data is not synchronized from the first storage to the third storage in the inactive copy relationship, and wherein the inactive copy relationship indicates changes to data in the first storage to copy from the first storage to the third storage.

17. The system of claim 14, further comprising:
a fourth system having a fourth storage, wherein the fourth system performs establishing an inactive copy relationship to copy data in a fourth storage to the third storage, wherein data is not synchronized from the fourth storage to the third storage in the inactive copy relationship, and wherein the inactive copy relationship indicates to copy data from the fourth storage to the third storage; and
wherein the first system further performs forwarding the command from the second system to the fourth system on at least one additional path to cause the fourth system to discard indication of changes at the fourth storage prior to the point-in-time.

18. The system of claim 17, wherein the at least one additional path between the first system and the fourth system comprises at least one path established using a reverse path establish command to establish a reverse path from a target server to a source server of a copy relationship that is sent in response to establishing a forward path from the source server to the target server.

19. The system of claim 14, wherein the second system sends the command to the third system on a third path concerning the second copy relationship between the third storage at the third system and the second storage.

20. A method for establishing paths between a first system having a first storage, a second system having a second storage, and a third system, comprising:
initiating a path establish request operation to establish a first path between the first system and the second system for a first copy relationship to copy data from the first storage to the second storage managed by the second system;
in response to the path establish request, establishing a pair of ports at the first system and the second system to use for the first path from the first system to the second system to copy data from the first storage to the second storage;
sending, by the first system, a reverse path establish request to the second system to establish a second path from the second system to the first system, wherein the second system sends a command to the first system on the second path for the third system;
establishing, by the second system, a second copy relationship from the second storage to a third storage managed by the third system; and
in response to copying data as of a point-in-time from the second storage to the third storage, sending, by the second system, the command on the second path to the first system to cause the first system to discard indication of changes at the first storage for a third copy relationship with the third storage prior to the point-in-time.

21. The method of claim 20, wherein the command sent on the second path by the second system in response the copying of the data as of the point-in-time from the second storage to the third storage comprises a toggle command to cause the first system to discard a first bitmap indicating first changes as of the point-in-time, indicate a second bitmap indicating second changes following the point-in-time as being a previous bitmap, and creating a current bitmap to indicate third changes following the second changes indicated in the previous bitmap to copy to the third storage.

22. The method of claim 21, further comprising:
establishing, by a fourth system, an inactive copy relationship to copy data in a fourth storage to the third storage, wherein data is not synchronized from the fourth storage to the third storage in the inactive copy relationship, and wherein the inactive copy relationship indicates to copy data from the fourth storage to the third storage; and forwarding, by the first system, the command from the second system to the fourth system on at least one additional path to cause the fourth system to discard indication of changes at the fourth storage prior to the point-in-time.

23. The method of claim 22, wherein the at least one additional path between the first system and the fourth system comprises at least one path established using a reverse path establish command to establish a reverse path from a target server to a source server of a copy relationship that is sent in response to establishing a forward path from the source server to the target server.

24. The method of claim 20, further comprising:
establishing, by the first system, the third copy relationship as an inactive copy relationship to copy data in the first storage to the third storage, wherein data is not synchronized from the first storage to the third storage in the inactive copy relationship, and wherein the inactive copy relationship indicates changes to data in the first storage to copy from the first storage to the third storage.

25. The method of claim 22, wherein the second system sends the command to the third system on a third path concerning the second copy relationship between the third storage at the third system and the second.

* * * * *